(12) United States Patent
Amrhein et al.

(10) Patent No.: US 7,369,904 B2
(45) Date of Patent: May 6, 2008

(54) INTEGRATION METHOD FOR AUTOMATION COMPONENTS

(75) Inventors: Armin Amrhein, Kuemmersbruck (DE); Johannes Birzer, Stulln (DE); Martin Kiesel, Poxdorf (DE); Regina Schmitt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 838 days.

(21) Appl. No.: 09/942,697

(22) Filed: Aug. 30, 2001

(65) Prior Publication Data

US 2002/0082737 A1 Jun. 27, 2002

(30) Foreign Application Priority Data

Dec. 27, 2000 (DE) ................. 100 65 418

(51) Int. Cl.
 *G05B 13/02* (2006.01)
(52) U.S. Cl. ......................................... 700/29
(58) Field of Classification Search ........... 700/29, 700/44, 19; 706/55
See application file for complete search history.

(56) References Cited

U.S. PATENT DOCUMENTS

| | | | | |
|---|---|---|---|---|
| 4,054,756 A | * | 10/1977 | Comella et al. | 379/88.26 |
| 4,068,155 A | * | 1/1978 | Robbins et al. | 318/568.1 |
| 4,227,253 A | * | 10/1980 | Ehrsam et al. | 380/45 |
| 4,238,853 A | * | 12/1980 | Ehrsam et al. | 380/45 |
| 4,242,730 A | * | 12/1980 | Golias et al. | 356/39 |
| 4,276,594 A | * | 6/1981 | Morley | 713/600 |
| 5,287,178 A | * | 2/1994 | Acampora et al. | 348/384.1 |
| 5,305,277 A | * | 4/1994 | Derwin et al. | 365/230.02 |
| 5,373,411 A | * | 12/1994 | Grass et al. | 361/64 |
| 5,459,485 A | * | 10/1995 | Tomita et al. | 345/589 |
| 5,565,360 A | * | 10/1996 | Lapota et al. | 435/286.7 |
| 5,600,711 A | * | 2/1997 | Yuen | 379/102.03 |
| 5,840,572 A | * | 11/1998 | Copeland et al. | 435/286.7 |
| 5,877,959 A | | 3/1999 | Kamiyama et al. | 364/474.01 |
| 5,995,449 A | * | 11/1999 | Green et al. | 367/83 |
| 6,122,756 A | * | 9/2000 | Baxter et al. | 714/30 |
| 6,182,049 B1 | * | 1/2001 | Barker et al. | 705/7 |
| 6,310,829 B1 | * | 10/2001 | Green et al. | 367/82 |
| 6,445,963 B1 | * | 9/2002 | Blevins et al. | 700/44 |
| 6,450,258 B2 | * | 9/2002 | Green et al. | 166/250.17 |
| 6,564,329 B1 | * | 5/2003 | Cheung et al. | 713/322 |

(Continued)

FOREIGN PATENT DOCUMENTS

DE 19740550 4/1998

(Continued)

OTHER PUBLICATIONS

Wikidedia definition for "PALM" (http://en.wikipedia.org/wiki/Personal_Digital_Assistant).*

(Continued)

*Primary Examiner*—Michael B. Holmes
(74) *Attorney, Agent, or Firm*—Baker Botts L.L.P.

(57) ABSTRACT

A method for integrating a number of automation components into an industrial controller with a uniform running level model of the runtime system. The basic clock of the running level model is devised from either an internal timer, an internal clock of a communication medium, an external device or from a variable (TG) which belongs to the technological process (P1, P2).

1 Claim, 4 Drawing Sheets

U.S. PATENT DOCUMENTS

| | | | |
|---|---|---|---|
| 6,650,880 B1* | 11/2003 | Lee et al. | 455/259 |
| 6,704,617 B2* | 3/2004 | Cherfane et al. | 700/239 |
| 6,763,883 B2* | 7/2004 | Green et al. | 166/250.17 |
| 6,778,971 B1* | 8/2004 | Altschuler et al. | 706/55 |
| 7,146,519 B2* | 12/2006 | Barr et al. | 713/500 |
| 7,149,913 B2* | 12/2006 | Barr et al. | 713/500 |
| 7,206,960 B2* | 4/2007 | Barr et al. | 713/600 |

FOREIGN PATENT DOCUMENTS

| | | |
|---|---|---|
| DE | 19931933 | 7/1999 |
| EP | 1 195 667 A2 | 12/2000 |
| EP | 1220067 | 12/2001 |

OTHER PUBLICATIONS

Implementing real-time event channels on CAN-bus Kaiser, J.; Brudna, C.; Mitidieri, C.; Factory Communication Systems, 2004. Proceedings. 2004 IEEE International Workshop on Sep. 22-24, 2004 pp. 247-256 Digital Object Identifier 10.1109/WFCS.2004.1377719.*

The consumer electronic bus symbol encoding sublayer: a twisted pair implementation Douligeris, C.; Khawand, J.; Khawand, C.; Southeastcon '92, Proceedings., IEEE Apr. 12-15, 1992 pp. 385-388 vol. 1 Digital Object Identifier 10.1109/SECON.1992.202375.*

Enhancements to the time synchronization standard IEEE-1588 for a system of cascaded bridges Jasperneite, J.; Shehab, K.; Weber, K.; Factory Communication Systems, 2004. Proceedings. 2004 IEEE International Workshop on Sep. 22-24, 2004 pp. 239-244 Digital Object Identifier 10.1109/WFCS.2004.1377716.*

A physical layer implementation for a twisted pair home automation system Khawand, J.; Douligeris, C.; Khawand, C.; Consumer Electronics, IEEE Transactions on vol. 38, Issue 3, Aug. 1992 pp. 530-536 Digital Object Identifier 10.1109/30.156733.*

Implementing real-time event channels on CAN-bus Kaiser, J.; Brudna, C.; Mitidieri, C.; Factory Communication Systems, 2004. Proceedings. 2004 IEEE International Workshop on Sep. 22-24, 2004 pp. 247-256 Digital Object Identifier 10.1109/WFCS.2004.1377719.*

Automatic Layout of Silicon-On-Silicon Hybrid Packages Preas, B.; Pedram, M.; Curry, D.; Design Automation, 1989. 26th Conference on Jun. 25-29, 1989 pp. 394-399.*

The consumer electronic bus symbol encoding sublayer: a twisted pair implementation Douligeris, C.; Khawand, J.; Khawand, C.; Southeastcon '92, Proceedings., IEEE Apr. 12-15, 1992 pp. 385-388 vol. 1 Digital Object Identifier 10.1109/SECON.1992.202375.*

Monitoring of a Class of Timed Discrete Events Systems Allahham, A.; Alia, H.; Robotics and Automation, 2007 IEEE International Conference on Apr. 10-14, 2007 pp. 1003-1008 Digital Object Identifier 10.1109/ROBOT.2007.363116.*

TITAC-2: an asynchronous 32-bit microprocessor Takamura, A.; Imai, M.; Ozawa, M.; Fukasaku, I.; Fujii, T.; Kuwako, M.; Ueno, Y.; Nanya, T.; Design Automation Conference 1998. Proceedings of the ASP-DAC '98. Asia and South Pacific Feb. 10-13, 1998 pp. 319-320 Digital Object Identifier 10.1109/ASPDAC.1998.669480.*

Fault tolerant quantum cellular array (QCA) design using triple modular redundancy with shifted operands Wei, T.; Wu, K.; Karri, R.; Orailoglu, A.; Design Automation Conference, 2005. Proceedings of the ASP-DAC 2005. Asia and South Pacific vol. 2, Jan. 18-21, 2005 pp. 1192-1195 vol. 2 Digital Object Identifier 10.1109/ASPDAC.2005.1466555.*

Scaling deeper to submicron: on-line testing to the rescue Nicolaidis, M.; Zorian, Y.; Design, Automation and Test in Europe Conference and Exhibition 1999. Proceedings Mar. 9-12, 1999 p. 432 Digital Object Identifier 10.1109/DATE.1999.761161.*

Switch-level timing models in the MOS simulator BRASIL Warmers, H.; Sass, D.; Horneber, E.-H.; Design Automation Conference, 1990. EDAC. Proceedings of the European Mar. 12-15, 1990 pp. 568-572 Digital Object Identifier 10.1109/EDAC.1990.136711.*

Discrete-time actuator fault estimation design for flight control application Jiong-Sang Yee; Bin Jiang; Jian Liang Wang; Yan Li; Control, Automation, Robotics and Vision, 2002. ICARCV 2002. 7th International Conference on vol. 3, Dec. 2-5, 2002 pp. 1287-1292 vol. 3.*

Design of Dynamic System Fault-Tolerant Control using IMM Estimation and RBF Neural Network Xudong Wang; Syrmos, V.L.; Control and Automation, 2006. MED '06. 14th Mediterranean Conference on Jun. 2006 pp. 1-6 Digital Object Identifier 10.1109/MED.2006.328822.*

Structural control for overlapping interconnected power systems Xue-Bo Chen; Stankovic, S.S.; Control and Automation, 2005. ICCA '05. International Conference on vol. 1, Jun. 26-29, 2005 pp. 391-396 vol. 1 Digital Object Identifier 10.1109/ICCA.2005.1528151.*

Industrial processes susceptibility in relation to their environment Sudria, A.; Galceran, S.; Yeste, G.; Rull, J.; Bergas, J.; Benitez, I.; Vazquez, L.; Emerging Technologies and Factory Automation, 2001. Proceedings. 2001 8th IEEE International Conference on Oct. 15-18, 2001 pp. 629-634 vol. 1 Digital Object Identifier 10.1109/ETFA.2001.9964.*

Fault Diagnosis Method for Mobile Robots Using Multi-CMAC Neural Networks Liu, Yutian; Jiang, Jingping; Automation and Logistics, 2007 IEEE International Conference on Aug. 18-21, 2007 pp. 903-907 Digital Object Identifier 10.1109/ICAL.2007.4338694.*

Active Fault-tolerant Control Design for a Class of Time-delay Systems Fuqiang You; Zuohua Tian; Songjiao Shi; Intelligent Control and Automation, 2006. WCICA 2006. The Sixth World Congress on vol. 2, Jun. 21-23, 2006 pp. 5535-5538 Digital Object Identifier 10.1109/WCICA.2006.1714132.*

High speed peer-to-peer communications based bus protection Apostolov, A.P.; Power Engineering Society Winter Meeting, 2001. IEEE vol. 2, Jan. 28-Feb. 1, 2001 pp. 693-698 vol. 2 Digital Object Identifier 10.1109/PESW.2001.916938.*

A computer-aided technique for generating substation interlocking schemes Sachdev, M.S.; Dhakal, P.; Sidhu, T.S.; Power Delivery, IEEE Transactions on vol. 15, Issue 2, Apr. 2000 pp. 538-544 Digital Object Identifier 10.1109/61.852981.*

Brigitte Barnreuther et al., "MAP-Anwendungsdienste uber einem Kommunikations-system fur heterogene Feldbus-Verbunde", ATP Automatisierungstechnische Praxis, No. 7, pp. 358-363, Jul. 1991.

Y. Altintas et al., "Modular CNC Design for Intelligent Machining, Part 1: Design of Hierarchical Motion Control Module for CNC Machine Tools", Transactions of the ASME, vol. 118, Nov. 1996.

Y. Altintas et al., "Modular CNC Design for Intelligent Machining, Part 2: Modular Integration of Sensor Based Milling Process Monitoring and Control Tasks", Transactions of the ASME, vol. 118, Nov. 1996.

N. Arda Erol, "Open System Architecture Modular Tool Kit for Motion and Machining Process Control", IEEE/ASME Transactions of Mechatronics, vol. 5., No. 3, Sep. 2000.

Matjaz Colnaric, "State of the Art Review Paper: Advances in Embedded Hard Real-Time Systems Design", IEEE, 1999.

VxWorks Programmer's Guide, Version 5.3.1, Edition 1, Mar. 4, 1998.

* cited by examiner

INTEGRATION METHOD FOR AUTOMATION COMPONENTS

CROSS REFERENCE TO RELATED APPLICATION

This application claims priority to German application number 10065418.5 filed Dec. 27, 2000.

BACKGROUND OF THE INVENTION

The invention relates to a method for the integration of a plurality of automation components in a uniform running level model of a respective runtime system of an industrial controller.

Today, it is customary, both for stored-program control (SPC) and for motion control (MC) systems, to have hierarchical running levels, and to have different software applications for controlling the respective technical processes. The software applications used today may be user-programmed, or they can have built-in system functions.

It is known from DE 197 40 550 A1 that process control functionalities of the stored-program controllers and motion functionalities of MC controllers can be integrated in a uniform configurable control system.

This SPC/MC integration is obtained by using SPC and MC control modules. However, when the integration is carried out in such a way, an optimum and efficient task structure is not achieved for all control tasks. Furthermore, mostly the classic MC functionalities are supported with this type of integration for machine tools, whereas other requirements for the controller, as they are known from the operation of production machines, are not optimally supported by this type of interconnection of SPC and MC control modules.

In German application DE 19 93 19 33.2 a communication system clock is used between the PC system and the peripheral devices to change between a real-time operating program and a non-real-time operating program. In this case, it is the task of this communication system clock to allow the smoothest possible change between real-time and non-real-time applications in an industrial process. In this configuration, however, the basic clock is only derived from the clock of the communication medium and is only used for changing the operating system mode of a PC system.

Accordingly there remains a need for the integration of a plurality of automation components in a uniform running level model of a respective run time systems in an industrial controller.

An object of the present invention is to create optimum distinctive characteristics of an industrial controller for an industrial controller having different control tasks and different boundary conditions or requirements of the underlying technical process, which provides both SPC and MC functionality or the functionalities of further automation components.

SUMMARY OF THE INVENTION

In order to meet this and other objects which will become apparent with reference to further disclosure set forth below the present invention provides an integration method for automation components in which optimum distinctive characteristics are achieved in principle by a uniform configurable running level model for the control tasks of the industrial controller.

In one embodiment, the method comprises the following steps:
a) analyzing the running properties of the automation components;
b) deriving a structure for a uniform running level model, that satisfies the requirements of the automation components involved;
c) assigning the system and user tasks into the running level model; and
d) programming the user level or the user levels.

This method allows a user to create in a defined, systematic and flexible an industrial controller with an integrative runtime system which combines process control functionalities of stored-program controllers "SPC", movement functionalities of "MC" controllers or functionalities of further automation components.

The stratification in system levels and running levels has the effect of minimizing the communication effort between the tasks which represent the functionalities of the different automation components. Furthermore, the programming of the control tasks for different automation components may be done in a uniform programming language with a uniform creation interface. In this way, the user can flexibly create a running level model tailor-made for his respective requirements.

A further advantage is that user programs can be loaded into the user levels. This allows the user to flexibly adapt the functionality of the automation components to the underlying requirements of the technical process in user programs.

In another embodiment of the present invention, the system and/or user levels may be prioritized. This increases the flexibility of the user in the creation of an integrative runtime system of an industrial controller.

In yet another embodiment of the present invention, the basic clock of the running level model is derived from an internal timer or from an internal clock of a communication medium or from an external device or from a variable which belongs to the technological process. As a result, the basic clock for the running level model can be derived in a flexible and easy manner. Since the basic clock for the running level model also can be derived from a variable which belongs to the technological process, direct feedback from the technological process to the controller easily may be obtained. The user consequently has great flexibility to create the basic clock. The basic clock can, for example, be derived from equidistant bus systems, such as Profibus.

In still another embodiment of the present invention, user programs are loaded into the user levels. This allows the user to flexibly adapt the functionality of the controller to the underlying requirements of the technical process in his user programs and also to load the user programs into different user levels, in order to achieve effective distinctive characteristics of the controller for respective applications.

In another embodiment of the present invention, programmed access to the overall functionality of the controller is obtained from the user programs. Consequently, the user can use the controller functionality from the user programs through a uniform interface.

DETAILED DESCRIPTION OF THE PREFERRED EMBODIMENTS

Figure 1:
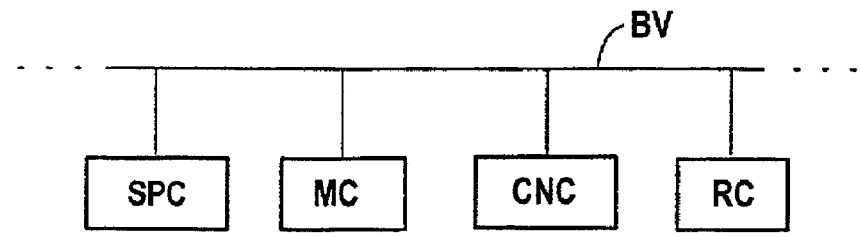
FIG. 1 is a block diagram presenting various automation components for operating technical processes.
Figure 4:
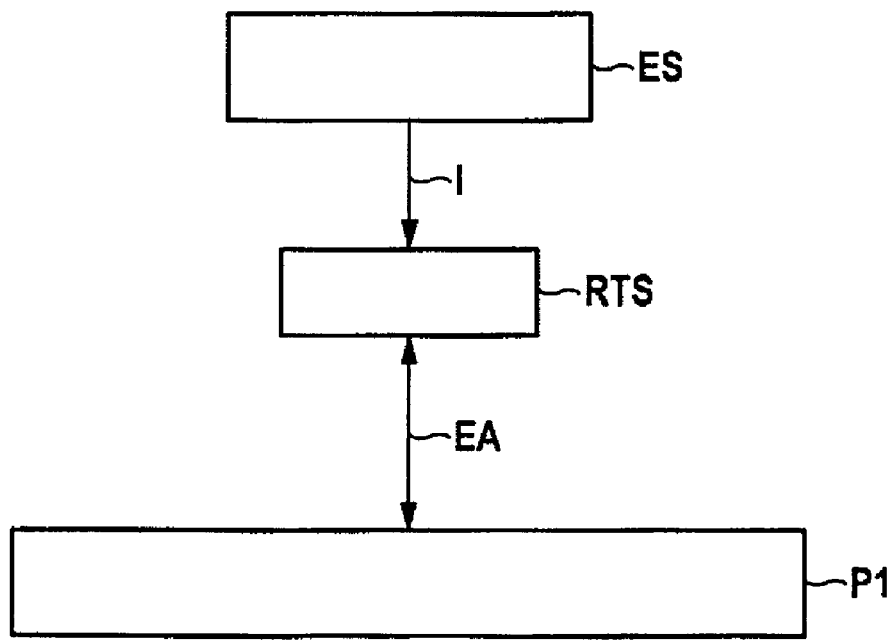
FIG. 4 is a block diagram of an industrial controller.
Figure 7:
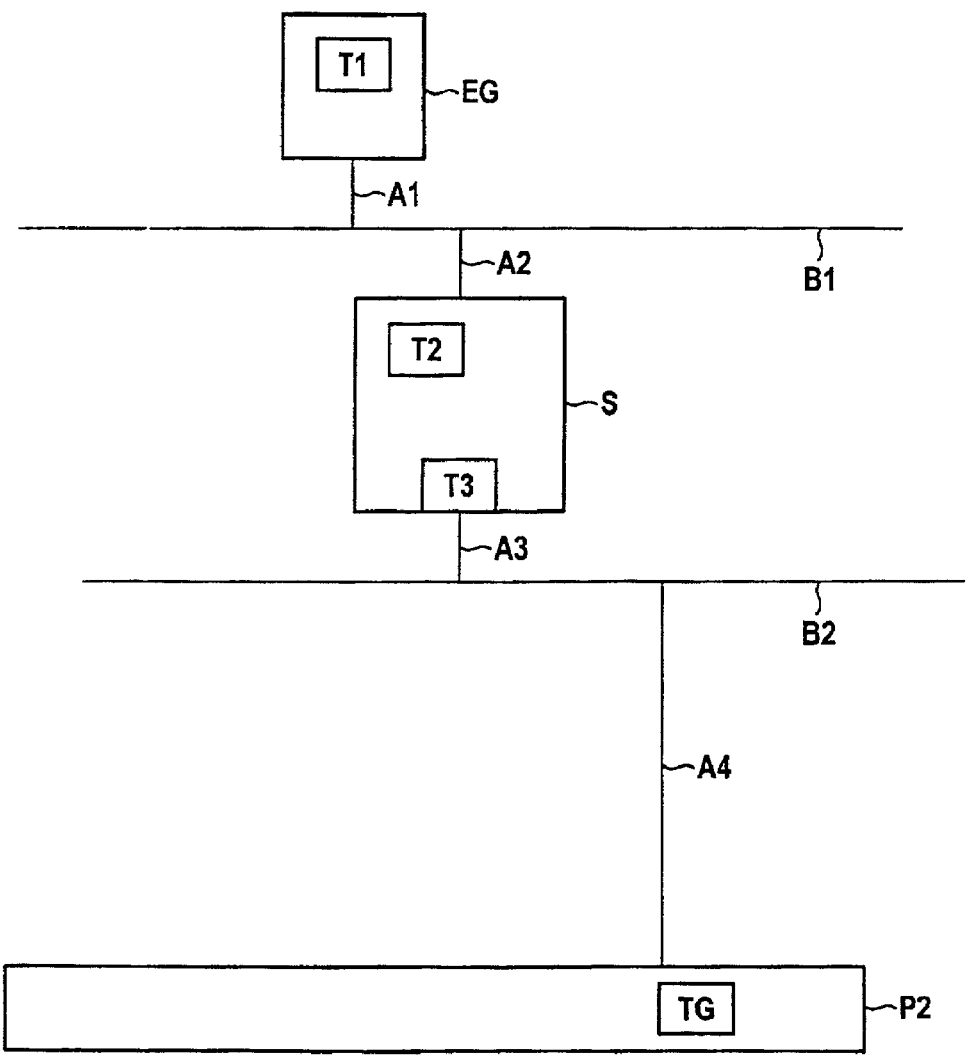
FIG. 7 is a block diagram illustrating how the basic clock is obtained for the industrial controller.

Referring to FIG. 1, a block diagram of various automation components, 10 (SPC, MC, CNC, RC) for the operation of a technical process (P1, P2; FIG. 4 and FIG. 7, respectively) is illustrated. The automation components 110 are connected to one another via a bus connection BV120. It is indicated by 3 dots both at the left end and right end of the bus connection BV120 that there may be other automation components on the bus connection BV120. In addition, the connection to an associated controller unit (industrial controller) or to control units is established by the bus connection BV120. The bus connection BV120 is chosen only by way of example; other communication media (for example ring connections or wireless connections) are also conceivable. The automation components (SPC, MC, CNC, RC) 110 have different characteristics and different running properties. The analysis of these properties by the user may be carried out by means of heuristic, empirical or other methods of analysis, including a combination of these methods. Response times and cycle times are examples of parameters which are taken into account in this analysis.

Figure 2:
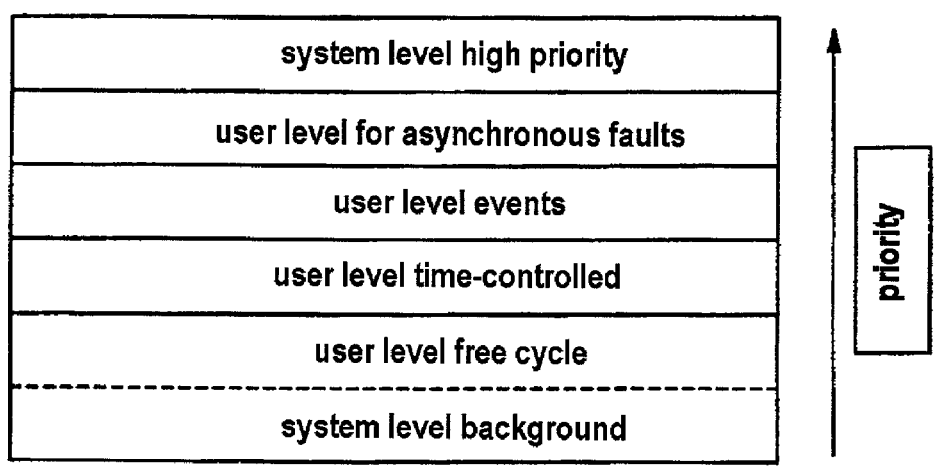
FIG. 2 is an illustrative diagram presenting a hierarchical structure of the main running levels of a classic stored-program controller.

Referring to FIG. 2, an illustrative diagram presenting a hierarchical structure of the main running levels of a classic stored-program controller (SPC), arranged according to their priority, is shown. The increase in priority is symbolized in FIG. 2 by an arrow 210. In the lowest-priority level 220, as indicated by a dashed line, two different tasks are performed, a free cycle 230, i.e. "user level free cycle" and a background system level 240, i.e. "system level background". The background system level 240 is generally reserved for communication tasks. In a user level, referred to as "user level time-controlled" 250, the calling clock of the tasks or of the programs at this level can be parameterized. Monitoring takes place to ascertain whether the processing of a user program of this clocked level has been completed in time before the start event occurs once again. If the clock time elapses without the user program of the assigned level being processed to completion, a corresponding task of a next-but-one, in priority terms, "user level for asynchronous faults" 260 is started. In this "user level for asynchronous faults" 260, the user can program the handling of fault states.

The "user level time-controlled" 250 running level is followed by a "user level events" 270 running level. The response to external or internal events takes place within the "user level events" 270. A typical example of such an event is the switching of a binary or digital input, whereby an event is triggered. A "system level high priority" 280 running level includes the tasks of the operating system which ensure the operating mode of the programmable controller (SPC).

Figure 3:
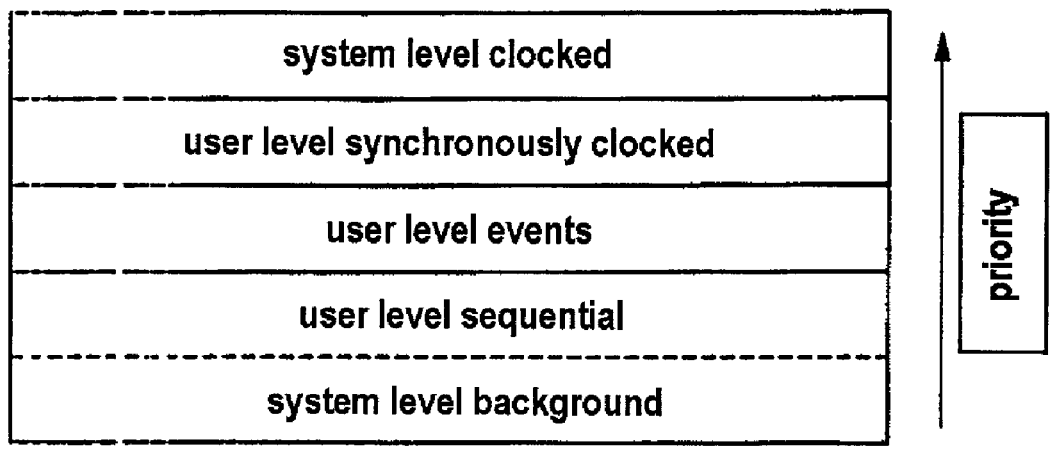
FIG. 3 is an illustrative diagram presenting a hierarchical structure of the main running levels of a motion controller.

Referring to FIG. 3, an illustrative diagram presenting a hierarchical structure of the main running levels of a motion controller (MC) is shown. As with the SPC, the individual levels of the MC are arranged hierarchically according to their priority, as symbolized by an arrow 310. A "system level background" 320 and a "user level sequential" 350 have an equal priority, that is the lowest priority. This common priority level is symbolized as in FIG. 2, by a dashed line. The tasks of the "user level sequential" 330 running level are processed together with the tasks of the "system level background" 320 running level in a round-robin procedure. Typical tasks of the "system level background" 320 are, for example, communication tasks. In the "user level sequential" 330, the parts of the program programmed by the user run for the actual control task. If, in one of these parts of the program, the controller encounters a movement or positioning command, a "suspend" is set, i.e., the user program is interrupted at this point. In this case, a command is synchronously used. The processing of this movement or positioning command takes place in a highest-priority "system level clocked" 340 running level. The position controllers or interpolators which are running in the "system level clocked" 340 running level execute this movement or positioning command. After execution of the command, control returns to the "user level sequential" 330 level and the user program interrupted by "suspend" is continued by a "resume" at the same point. The "system level clocked" 340 level contains not only the already mentioned position controllers but also the interpolation part of the control.

A "user level events" 350 level resumes at the lowest-priority level. This level accommodates the tasks which respond to external or internal events, such as alarms.

In a "user level synchronously clocked" 360 level, synchronously clocked user tasks are performed, such as controller functionalities. These tasks are synchronized in relation to clocked system functions, such as the interpolator, position controller or cyclical bus communication.

A "user level events" 350 running level accommodates those tasks which respond to external or internal events. Such events may be alarms, for example.

Referring to FIG. 4, a block diagram of an industrial controller is illustrated. The control of a technical process P1 is performed by means of the runtime system RTS of an industrial controller. The connection between the runtime system RTS of the controller and the technical process P1 takes place bidirectionally via the inputs/outputs EA. The programming of the controller, and consequently fixing the behavior of the runtime system RTS, takes place in the engineering system ES. The engineering system ES contains tools for configuring, project planning and programming for machines or for controlling technical processes. The programs created in the engineering system ES are transferred via the information path I into the runtime system RTS of the controller. With respect to its hardware equipment, an engineering system ES usually includes a computer system with a graphics screen (for example display), input aids (for example keyboard and mouse), at least one processor, main memory and secondary memory, a device for accepting computer-readable media (for example floppy disks, CDs) and also connection units for data exchange with other systems (for example further computer systems, controllers for technical processes) or media (for example the Internet). A controller usually comprises input and output units, and also a processor and program memory. It is also conceivable for the control of a technical process P1 to be performed by means of a plurality of runtime systems RTS of industrial controllers.

Figure 5:
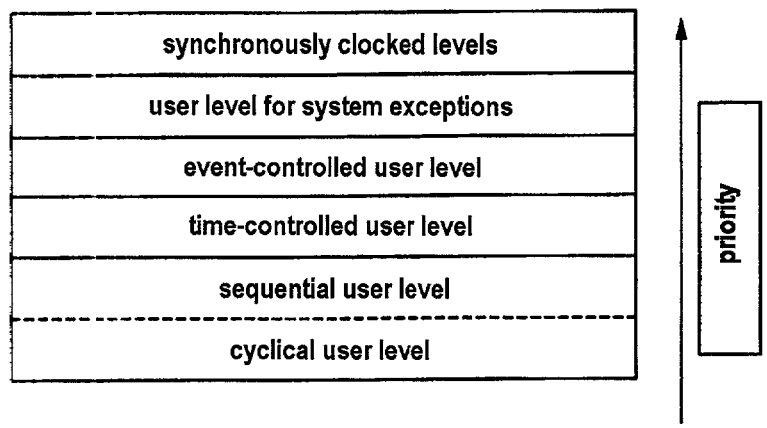
FIG. 5 is an illustrative diagram presenting a hierarchical structure of the integrative running level model of the runtime system of the industrial controller.

Referring to FIG. 5, an illustrative diagram presenting a hierarchical structure of the integrative running level model of the runtime system (RTS; FIG. 4) of the industrial controller is shown. The prioritizing of the levels is indicated by an arrow 510 in the direction of the highest priority. The lowest-priority levels are a "cyclical user level" 520 and a "sequential user level" 530. These two levels run with the same priority. Therefore, these levels are separated in the representation by a dashed line. The "cyclical user level" 520 includes a "background task," which is cycle-time-monitored. In the "sequential user level" 530, the "motion tasks" are run through. The "Motion tasks" are not cycle-time-monitored and serve essentially for describing motion sequences. The "Motion tasks" are processed virtually in parallel. Generally, all the user levels contain one or more tasks. The tasks receive the user programs. The tasks of the "cyclical user level" 520 and of the "sequential user level" 530 are processed in a common round-robin cycle.

The next-following level is the "time-controlled user level" 540. The tasks of this level are activated in a time-controlled manner. The time control may be set in milliseconds. The "time-controlled user level" 540 is followed by the "event-controlled user level" 550. At this level, after detection of a user interrupt, "user interrupt tasks" are activated. User interrupt events may be formulated as a logical combination of process events and/or internal states.

The next higher level is a "user level for system exceptions" 560. In the "user level for system exceptions" 560, monitoring is carried out of system interrupts, the occurrence of which has the effect of generating "exceptions", i.e. instances of handling exceptional cases. In the "user level for system exceptions" 560, there are, for example, the following tasks, which are activated when a corresponding system interrupt occurs:

a) "time fault task", which is activated when time monitors respond;
b) "peripheral fault task", which is activated, for example, in the event of process and diagnosis alarms, but also in the event of station failure or station return;
c) "system fault task", which is activated in the event of general system faults;
d) "program fault task", which is activated in the event of programming faults (for example division by zero);
e) "time fault background task", which is activated when the cycle time monitoring of the background task responds; and
f) "technological fault task", which is activated in the event of technological faults.

Figure 6:
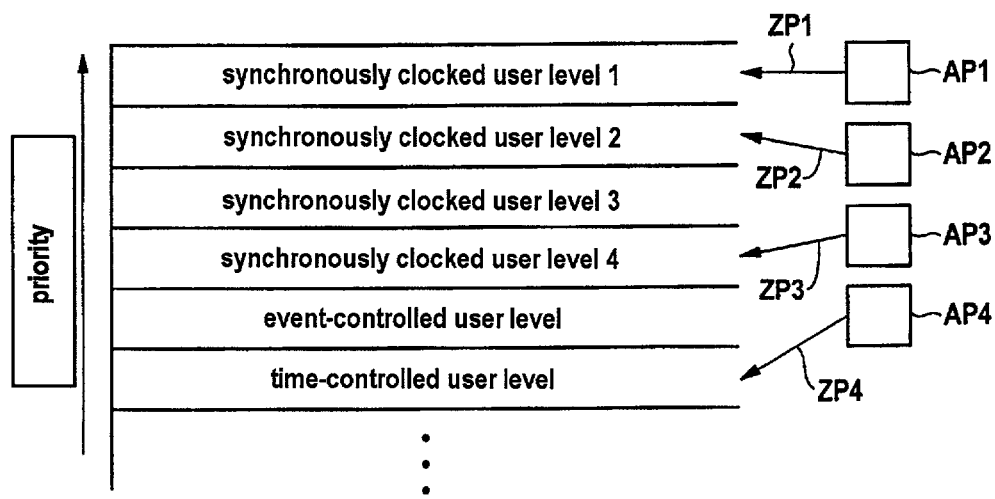
FIG. 6 is an illustrative diagram presenting the loading of user programs into the user levels.

The next group of levels is a "synchronously clocked levels" group 570. This group of levels has the highest priority in the running level model. The individual levels of this group of levels may have further prioritization with respect to one another. The group of levels "synchronously clocked levels" 570 comprises at least one system level and at least one user level. The system levels include the system functions, such as, position controller or interpolator. User programs (AP1-AP4; FIG. 6) also can be flexibly loaded by a user into the user levels of this group.

There are a number of different possibilities for clock generation for the clock control of the "synchronously clocked levels" 570. For example, the basic clock may come from an internal timer (T1; FIG. 7) or from an internal clock (T3; FIG. 7) of a communication medium (for example Profibus) or else the clock may also be derived from a process event of the technological process. Such a process event may be, for example, the clock rate (TG; FIG. 7) of an operation on a production machine or packaging machine. User levels of the group of "synchronously clocked levels" 570 may in this case be clocked on the basis of the basic clock, but they may also run synchronously in relation to one of the system levels of the group of "synchronously clocked levels" 570. The user tasks of this user level synchronous to a system level consequently have a synchronous, i.e. deterministic, relationship with a system level which can be flexibly fixed by the user. This has the advantage that deterministic responses to system tasks (system tasks run in the system levels) which the user has programmed in his user tasks, which run in the user levels of the group of levels "synchronously clocked levels" 570, are guaranteed by the system. That is to say, for example, that the system guarantees that this "synchronous user level" is correspondingly activated for example before the interpolator, or else before any other desired system function.

The "time-controlled user level" 540, the "event-controlled user level" 550, the "sequential user level" 530, the "cyclical user level" 520 and a "user level for system exceptions" are optional.

The task of the "cyclical user level" 520 (background task) is cycle-time-monitored. The "motion tasks", on the other hand, are not cycle-time-monitored and serve essentially for describing sequential sequences. In other words, the present running level model supports a user both in the programming of sequential sequences and in event programming. Consequently, synchronous events and asynchronous events can be covered by the programming. The user programs (AP1-AP4; FIG. 6) created by the user also can be loaded into the user levels. The user programs AP1 to AP4 are usually created with the aid of a programming environment of the engineering system (ES; FIG. 4).

Referring to FIG. 6, an illustrative diagram presenting the additional loading of user programs into the user levels and distinctive characteristics of user levels of the running level model is shown. There also may be other user levels, or else system levels as indicated by three dots. The prioritizing of the levels is indicated as above by an arrow 610 in the direction of the highest priority. The user levels are assigned the user programs AP1 to AP4, indicated at the right-hand edge of the figure by small squares. The assignment is shown by assignment arrows ZP1 to ZP4. In the user levels there are tasks which receive the additionally loaded user programs AP1 to AP4. These tasks are then run through or processed in accordance with a specific strategy (for example sequentially).

Referring to FIG. 7, a block diagram presenting how the basic clock is obtained for the industrial controller is illustrated. FIG. 7 shows by way of example a communication topology into which the controller S is integrated. The controller S is connected by a connection line A2 to the bus B1, to which the external device EG is attached via a connection line A1. The connection to the technical process P2 takes place via the bus B2. The controller S is connected via the connection line A3 to the bus B2, which in turn establishes the connection to the technical process P2 via the connection line A4.

The generation of the basic clock of the controller S can take place from different clock sources. For example, from an internal clock source, represented by the internal timer T2 of the controller S or else by an external clock source, such as for example the timer T1, which belongs to the external device EG. The basic clock of a communication medium may also serve, however, as an external clock source. If the bus B2 is realized for example by an equidistant Profibus, the clock for the controller can be obtained from the basic clock of this bus. This is represented in FIG. 7 by the timer T3 being positioned directly on the connection line A3, and this connection line A3 establishes the connection to the bus B2. The controller is consequently attached to the bus as a slave and can use the bus clock directly.

There are several variant ways in which the clock for the controller can be obtained from the basic clock of a communication medium (for example a bus). On the one hand, the controller S may be the slave on the bus; the clock information then comes from outside via the bus. On the other hand, the controller S may be the master on the bus. The clock source in this case is provided in the controller S. Two forms with distinctive characteristics exist for this case. The clock source may lie in a master-bus access circuit or the clock source is in the controller S, in which case the clock is fed into the master-bus access circuit. Furthermore, a clock generator TG which is integrated in the technical process P2 may serve as an external clock source. A clock generator TG in a technical process may be, for example, the operating cycle of a production machine or packaging machine. In the representation according to FIG. 7, bus connections are represented by way of example as communication media. However, ring, star or other types of connection may also be chosen as communication media, as well as wireless connections. The basic clock mentioned above can then be derived from these connection systems.

The foregoing merely illustrates the principles of the invention. Various modifications and alterations to the described embodiments will be apparent to those skilled in the art in view of the teachings herein.

It will thus be appreciated that those skilled in the at will be able to devise numerous techniques which although not explicitly shown or described herein, embody the principles of the invention and are thus within the spirit and scope of the invention.

We claim:

1. An automation system, comprising an industrial controller for integrating a plurality of automation components in a uniform configurable running level model of a respective runtime system of the industrial controller, the runtime system having the uniform configurable running level model including a low priority user level for system exceptions and a high priority synchronously clocked level, wherein the user level for system exceptions includes at least one element chosen from the group consisting of a time fault task, a peripheral fault task, a system fault task, a program fault task, a time fault background task and a technological fault task, the synchronously clocked level comprises at least one system level and at least one user level, a first clock for clock control of the synchronously clocked level is derived from a process event of a technological process, and a second clock for clock control of the at least one user level of the synchronously clocked level is derived from the first clock, or the user level of the synchronously clocked level runs synchronously relative to the system level of the synchronously clocked level.

* * * * *